3,112,308
SUBSTITUTED 10-(4-CARBALKOXY-4-PHENYL-
PIPERIDINOALKYL) PHENOTHIAZINES
Harman S. Lowrie, Northbrook, Ill., assignor to G. D.
Searle & Co., Chicago, Ill., a corporation of Delaware
No Drawing. Filed Nov. 20, 1961, Ser. No. 153,749
5 Claims. (Cl. 260—243)

The present invention relates to a group of compounds which are 4-carbalkoxy-4-phenylpiperidino-alkyl derivatives of phenothiazine. More particularly, it relates to compounds having the following general formula

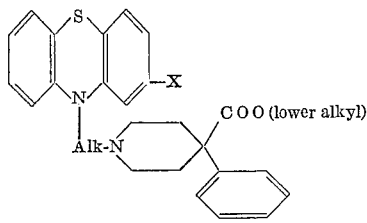

wherein Alk is a lower alkylene radical and X is selected from the group consisting of halogen and lower alkanoyl. The halogen radicals referred to above include fluorine, chlorine, bromine, and iodine. The lower alkyl and the lower alkanoyl radicals referred to above are straight-chain or branched radicals containing up to 6 carbon atoms. Examples of the lower alkyl radicals are methyl, ethyl, propyl, and butyl. Examples of the lower alkanoyl radicals are acetyl, propionyl, and butyryl. Likewise, the lower alkylene radicals referred to above contain up to 6 carbon atoms although trimethylene is preferred.

Equivalent to the basic amines of this invention for the purposes here described are their non-toxic acid addition salts and quaternary ammonium salts. Such salts are formed with a variety of inorganic and strong organic acids including sulfuric, phosphoric, hydrochloric, citric, maleic, and related acids. Quaternary ammonium salts are formed with a variety of organic esters of sulfuric, hydrohalic, and aromatic sulfonic acids. Among such esters are methyl chloride and bromide, ethyl chloride, propyl chloride, dimethyl sulfate, methyl benzenesulfonate, ethylene chlorohydrin, and allyl bromide.

The compounds of this invention are useful because of their valuable pharmacological properties. More particularly, these compounds show antihypertensive activity.

The compounds of this invention can be prepared by heating an appropriate 10-haloalkylphenothiazine of the formula

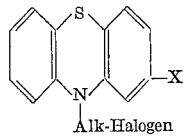

wherein Alk and X are defined as above with a 4-carbalkoxy-4-phenylpiperidine corresponding to the formula

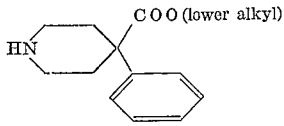

Butanone is a convenient solvent for carrying out the reaction, but other inert solvents such as ethanol and benzene are also satisfactory.

The compounds which constitute this invention and their preparation will appear more clearly from a consideration of the following examples which are given for the purpose of illustration only and are not to be construed as limiting the invention in spirit or scope. In these examples, quantities are indicated in parts by weight, temperatures in degrees centigrade (° C.), and pressures in millimeters of mercury (mm.).

*Example 1*

A mixture of 15.5 parts of 10-(γ-chloropropyl)-2-chlorophenothiazine, 14 parts of 4-phenyl-4-carbethoxypiperidine hydrochloride, 3 parts of sodium iodide, 3.1 parts of potassium hydroxide, 10 parts of triethylamine, and 240 parts of butanone are stirred and refluxed for 12 hours. The reaction mixture is filtered and the solvent is evaporated from the filtrate under reduced pressure. The oily residue is dissolved in benzene and the benzene solution is washed successively with dilute potassium hydroxide solution, water, dilute hydrochloric acid, and again with dilute potassium hydroxide solution. The benzene solution is dried over anhydrous potassium carbonate and the solvent is evaporated under reduced pressure. The oily residue is dissolved in 60 parts of hot ethanol together with 5.8 parts of maleic acid. The resultant mixture is cooled to room temperature, diluted to 250 milliliters with ether, and then cooled to 0° C. The precipitated powder is filtered off and recrystallized from 40 parts of ethanol to give the maleic acid salt of 10-[γ-(4-carbethoxy-4-phenylpiperidino)propyl]-2-chlorophenothiazine melting at about 154–158° C. The free base of this compound has the following formula

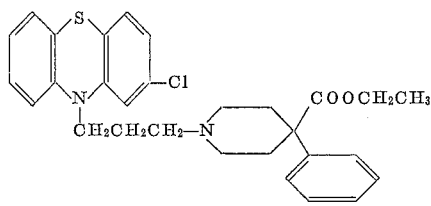

*Example 2*

If an equivalent quantity of 4-phenyl-4-carbomethoxy-piperidine hydrochloride is substituted for the 4-phenyl-4-carbethoxypiperidine hydrochloride of Example 1 and the procedure of Example 1 is repeated, the product obtained is the maleic acid salt of 10-[γ-(4-carbomethoxy-4-phenylpiperidino)propyl[-2-chlorophenothiazine.

*Example 3*

A mixture of 13.3 parts of 10-(γ-chloropropyl)-2-propionylphenothiazine, 14 parts of 4-phenyl-4-carbethoxy-piperidine hydrochloride, 3 parts of sodium iodide, 3.1 parts of potassium hydroxide, 10 parts of triethylamine and 240 parts of butanone is stirred and refluxed for 12 hours. The resultant mixture is filtered and the solvent is evaporated from the filtrate under reduced pressure. A benzene solution of the residual oil is washed first with dilute potassium hydroxide solution and then successively with water, dilute hydrochloric acid and again with dilute potassium hydroxide solution before it is dried over anhydrous potassium carbonate. Evaporation of the solvent under reduced pressure leaves an oily residue which is dissolved in 60 parts of hot ethanol along with 4.8 parts of maleic acid. The resultant mixture is cooled to room temperature, diluted with ether, and cooled to 0° C. The precipitate which forms is filtered off and recrystallized from alcohol to give the maleic acid salt of 10-[γ-(4-carbethoxy-4-phenylpiperidino)-propyl]-2-propionylphenothiazine melting at about 151–154° C. The free base of this compound has the following formula

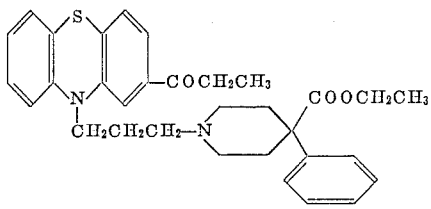

*Example 4*

The substitution of 12.7 parts of 10-(γ-chloropropyl)-2-acetylphenothiazine for the 13.3 parts of 10-(γ-chloropropyl)-2-propionylphenothiazine called for in Example 3 affords, by the procedure therein detailed, the maleic acid salt of 10-[γ-(4-carbethoxy-4-phenylpiperidino)-propyl]-2-acetylphenothiazine. The free base of this compound has the formula

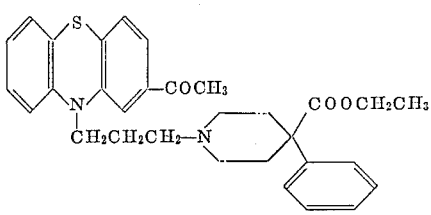

*Example 5*

If an equivalent quantity of 4-phenyl-4-carbomethoxypiperidine is substituted for the 4-phenyl-4-carbethoxypiperidine and the procedure of Example 3 is repeated, the product is the maleic acid salt of 10-[γ-(4-carbomethoxy - 4 - phenylpiperidino) - 2 - propionylphenothiazine. The free base of this compound has the following formula

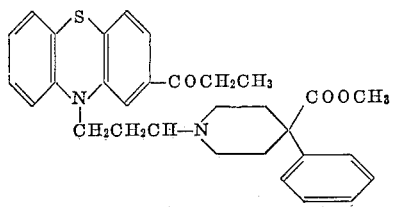

What is claimed is:
1. A compound of the formula

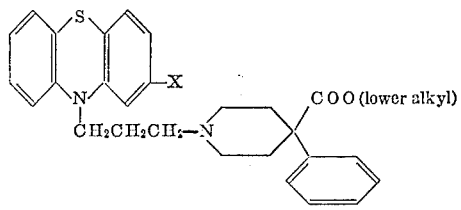

wherein X is selected from the group consisting of chlorine and lower alkanoyl.

2. A compound of the formula

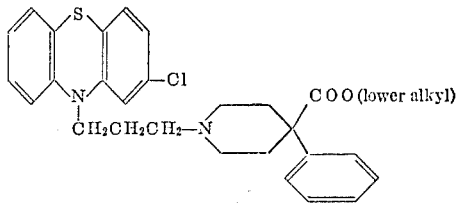

3. 10 - [γ - (4 - carbethoxy - 4 - phenylpiperidino)-propyl]-2-chlorophenothiazine.

4. A compound of the formula

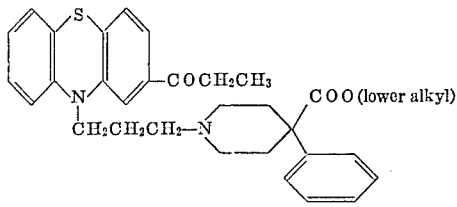

5. 10 - [γ - 4 - carbethoxy - 4 - phenylpiperidino)-propyl]-2-propionylphenothiazine.

References Cited in the file of this patent
UNITED STATES PATENTS
2,795,581    Stern et al. _____ June 11, 1957
FOREIGN PATENTS
560,750    Belgium _____ Sept. 30, 1957
562,299    Belgium _____ May 12, 1958
OTHER REFERENCES
Anderson et al.: J. Chem. Soc., 1956, pages 4088 to 4091.